US012146359B2

(12) United States Patent
Wittelsbürger (10) Patent No.: US 12,146,359 B2
(45) Date of Patent: Nov. 19, 2024

(54) DRIVE ASSEMBLY FOR A FLAP OF A MOTOR VEHICLE

(71) Applicant: Brose Fahrzeugteile SE & Co. Kommanditgesellschaft, Bamberg, Bamberg (DE)

(72) Inventor: Michael Wittelsbürger, Bamberg (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 672 days.

(21) Appl. No.: 17/274,497

(22) PCT Filed: Sep. 10, 2019

(86) PCT No.: PCT/EP2019/074018
§ 371 (c)(1),
(2) Date: Mar. 9, 2021

(87) PCT Pub. No.: WO2020/053162
PCT Pub. Date: Mar. 19, 2020

(65) Prior Publication Data
US 2022/0049534 A1 Feb. 17, 2022

(30) Foreign Application Priority Data
Sep. 11, 2018 (DE) ...................... 10 2018 122 135.5

(51) Int. Cl.
*B62D 25/12* (2006.01)
*E05F 1/10* (2006.01)
(Continued)

(52) U.S. Cl.
CPC .......... *E05F 1/1091* (2013.01); *F16F 9/5126* (2013.01); *B62D 25/12* (2013.01); *E05F 15/622* (2015.01); *E05Y 2900/548* (2013.01)

(58) Field of Classification Search
CPC ...... B62D 25/10; B62D 25/105; B62D 25/12; E05Y 2900/536; E05Y 2900/546;
(Continued)

(56) References Cited

U.S. PATENT DOCUMENTS 4,433,759 A * 2/1984 Ichinose .................. F16F 9/50
188/282.8
4,595,182 A * 6/1986 Freitag .................. F16F 9/0227
267/64.12
(Continued)

FOREIGN PATENT DOCUMENTS

DE 3813402 A1 11/1989
DE 19649836 A1 6/1998
(Continued)

*Primary Examiner* — Gregory A Blankenship
(74) *Attorney, Agent, or Firm* — Dickinson Wright PLLC (57) ABSTRACT

A drive assembly for a flap of a motor vehicle includes at least one motor drive and at least one gas pressure element having a cylinder and a piston. The piston divides the cylinder interior into two partial spaces and has a passage arrangement, through which a balancing flow between the two partial spaces arises when the piston moves. The gas pressure element has a first drive connection point connected to the cylinder and a second drive connection point connected to the piston. A switchable valve assembly is associated with the piston and can be brought into a closed state, in which the valve assembly at least partially closes the passage arrangement, and it has an open state, in which the valve assembly opens the passage arrangement. The passage arrangement automatically switches into the closed state in the event of a balancing flow that exceeds a predefined switching flow.

18 Claims, 3 Drawing Sheets

(51) Int. Cl.
*E05F 15/622* (2015.01)
*F16F 9/512* (2006.01)

(58) Field of Classification Search
CPC ......... E05Y 2900/548; E05Y 2900/532; E05F 3/0212; E05F 3/223; E05F 1/091; E05F 1/292; F16F 9/5126; F16F 9/504
See application file for complete search history.

(56) References Cited

U.S. PATENT DOCUMENTS

| | | | | |
|---|---|---|---|---|
| 4,961,482 A * | 10/1990 | Pohlenz | ................... | F16F 9/348 137/854 |
| 5,106,065 A * | 4/1992 | Staton | ................... | F16F 9/0209 188/269 |
| 5,404,972 A * | 4/1995 | Popjoy | ...................... | F16F 9/02 188/322.22 |
| 6,007,057 A * | 12/1999 | Fuhrmann | ................ | E05F 3/02 188/322.22 |
| 6,959,797 B2 * | 11/2005 | Mintgen | ............... | F16F 9/0218 188/282.5 |
| 7,073,642 B2 * | 7/2006 | Keller | ................... | F16F 9/5126 188/282.5 |
| 10,094,157 B2 | 10/2018 | Pyo | | |
| 2009/0206531 A1 | 8/2009 | Probst | | |
| 2011/0226973 A1 * | 9/2011 | Manuel | ................. | F16F 13/007 251/48 |
| 2011/0290575 A1 * | 12/2011 | Kaiser | ................... | F16B 21/078 296/193.11 |
| 2014/0238796 A1 * | 8/2014 | Yamashita | ................ | F16F 7/09 188/271 |
| 2017/0114580 A1 * | 4/2017 | Dietzel | ................. | E05F 15/622 |
| 2017/0136985 A1 * | 5/2017 | Narita | ..................... | E05D 3/186 |
| 2019/0133320 A1 * | 5/2019 | Chen | ....................... | E05F 5/027 |
| 2020/0290682 A1 * | 9/2020 | Sasaki | .................... | B60R 21/38 |
| 2021/0040785 A1 * | 2/2021 | Wittelsbürger | ........ | E05F 15/622 |
| 2021/0180385 A1 * | 6/2021 | Wolf | .................... | E05F 15/622 |
| 2022/0049534 A1 * | 2/2022 | Wittelsbürger | ........ | E05F 1/1091 |
| 2023/0039706 A1 * | 2/2023 | Enders | ..................... | E05F 3/12 |
| 2023/0272657 A1 * | 8/2023 | Wittelsbürger | ........ | F15B 13/042 60/459 |

FOREIGN PATENT DOCUMENTS

| | | | | |
|---|---|---|---|---|
| DE | 19846373 | A1 | 4/2000 | |
| DE | 102005044578 | B3 | 5/2007 | |
| DE | 102008010249 | A1 | 8/2009 | |
| DE | 102008057014 | A1 | 5/2010 | |
| DE | 102011006011 | A1 | 9/2012 | |
| EP | 1508721 | A1 | 2/2005 | |
| EP | 3483373 | A1 * | 5/2019 | ............... E05F 3/12 |
| JP | 2018040491 | A | 3/2018 | |
| KR | 101408768 | B1 | 6/2014 | |
| SE | 540238 | C2 * | 5/2018 | ............... B60J 5/04 |

* cited by examiner

DRIVE ASSEMBLY FOR A FLAP OF A MOTOR VEHICLE

CROSS-REFERENCE TO RELATED APPLICATIONS

This application is the U.S. National Phase of PCT Application No. PCT/EP2019/074018 filed on Sep. 10, 2019, which claims priority to German Patent Application No. DE 10 2018 122 135.5, filed on Sep. 11, 2018, the disclosures of which are hereby incorporated in their entirety by reference herein.

TECHNICAL FIELD

The present disclosure relates to a drive arrangement for a flap such as a liftgate, of a motor vehicle.

BACKGROUND

A drive arrangement may be used for motor-operated adjustment of any closure elements of a motor vehicle. Examples of such closure elements may include liftgates, trunk lids, engine hoods, load compartment floors, but also doors of a motor vehicle. In this respect, the term "flap" here should be understood in a broad sense.

SUMMARY

One or more objects of the present disclosure may be to address a problem of refining and further developing the known drive arrangement in such a manner that a further possibility is created for opposing the weight of a corresponding flap.

According to one or more embodiments, a gas pressure element which has a switchable valve arrangement permitting automatic switching over of the gas pressure element from a normal mode into an emergency mode, is provided.

A gas pressure element very generally here means an element with a cylinder and a piston which is guided therein coaxially with respect to the cylinder axis thereof and, in the movement-free and/or in the moving state of the piston relative to the cylinder, provides a pneumatic and/or hydraulic pressure, in particular a static and/or dynamic pressure, between the cylinder and the piston of the gas pressure element. The cylinder here is filled with at least one fluid, in particular a gas and/or a liquid, and the gas and/or the liquid can be filled into the cylinder under pressure, i.e. with a pressure above or below the ambient pressure, or without pressure, i.e. with a pressure substantially corresponding to the ambient pressure. The gas pressure element may be formed solely by a gas spring, in particular a gas compression spring or a gas tension spring, i.e. by a cylinder-piston arrangement in which the piston is filled with a fluid under pressure, in particular positive pressure. The gas pressure element may also be formed by a gas damper, i.e. by a cylinder-piston arrangement in which the piston is filled with a pressure-free fluid. The gas pressure element may also have such a cylinder-piston arrangement, in particular a gas spring and/or a gas damper, as one component and a spring arrangement acting parallel or coaxially to the cylinder axis and therefore to the direction of action of the gas pressure element or the gas spring or the gas damper as a further component. In this respect, the terms "gas pressure element", "gas spring" and "gas damper" should therefore be understood in a broad sense.

In the normal mode, the gas spring or the gas damper of the gas pressure element provided according to the proposal functions as a conventional gas spring or a conventional gas damper which, in a customary manner per se, has a fluid-filled, in particular gas- and/or liquid-filled, cylinder and a piston guided in the cylinder. The gas pressure element uses the compressibility of the inserted fluid, in particular gas, for the resilient or damping effect thereof. In the case of a gas spring, the pressurized fluid presses against the cross-sectional surface of the piston and thereby drives apart the cylinder-side drive connection and the piston-side drive connection, via which connections the gas spring is in each case coupled to the vehicle. If the gas spring is loaded beyond the force defined from the filling pressure and cross-sectional surface of the piston, the two drive connections are driven toward each other. In the case of a gas damper, the fluid of which is therefore pressure-free, the drive connections are movable relative to one another by a movement introduced into the gas pressure element from the outside, for example by a manual actuation, or actuation brought about via a motor-operated drive, of the liftgate, as a result of which the fluid is pressurized by the cross-sectional surface of the piston. The piston, in particular the basic body thereof, which is also referred to as a piston head, divides the cylinder interior into two partial spaces both in the case of a gas spring and in the case of a gas damper, with an overflow channel arrangement which is formed in particular at least partially by the basic body causing the fluid to flow from the one partial space into the respectively other partial space. The corresponding flow is referred to below as compensating flow.

In the emergency mode, the valve arrangement automatically at least partially, or completely, closes the overflow channel arrangement, that is to say one or more partial channels provided by the overflow channel arrangement, as a result of which a movement of the drive connections relative to one another, in particular toward one another, is braked or blocked. The valve arrangement automatically switches here from the normal mode into the emergency mode when the compensating flow exceeds a predetermined switching flow, i.e. in particular a limit value for the flow speed of the compensating flow is reached. The automatic switching of the valve arrangement is thus reached by an increase in the flow or the flow speed to a determined limit value.

In detail, it is proposed that the piston is assigned a switchable valve arrangement which can be brought into a closed state, in which it at least partially, or completely, closes the overflow channel arrangement, and into an open state, in which it opens the overflow channel arrangement, and the overflow channel arrangement automatically switches into the closed state in the event of an, in particular emergency-necessitated, compensating flow which exceeds a predetermined switching flow. The drive arrangement according to the proposal makes it thereby possible to brake and/or to block a closing movement of the flap, in particular liftgate, of a motor vehicle via the switchable valve arrangement. A relatively large weight of a flap may thus also be opposed particularly simply, and therefore the flap may be held in an open position or at any rate a closing movement of the flap may be significantly slowed.

According to another embodiment, the gas pressure element has a spring arrangement comprising at least one helical spring, in particular helical compression spring or helical tension spring. The spring arrangement acts parallel or coaxially to the cylinder axis and thereby in particular pretensions the drive connections relative to one another. As an example, the drive connections are thereby driven apart or driven toward one another. A spring arrangement may be provided, inter alia, whenever the gas pressure element has a gas damper, i.e. the cylinder-piston arrangement itself does not have any resilient action. As an example a spring arrangement may be provided in combination with a gas spring. The respective helical spring may be arranged parallel or coaxially to the cylinder, in particular radially surrounding the latter.

According to another embodiment, the switching flow bringing about the automatic switching of the valve arrangement corresponds to a piston speed within a range of between 20 mm/s and 200 mm/s, or between 40 mm/s and 70 mm/s, in particular of 50 mm/s. The "piston speed" means the speed at which the piston moves linearly relative to the cylinder. At a lower piston speed than that previously mentioned, the compensating flow is of such a small size that the valve arrangement remains in an open state in which the overflow channel arrangement remains open. The reaching of the respective limit value which defines the switching flow then leads in particular directly to the switching or activating of the valve arrangement and thereby to partial or complete closing of the overflow channel.

As an example, the overflow channel arrangement has at least two partial channels, of which at least one is at least partially, or completely, closed in the closed state, i.e. when the valve arrangement is activated. In particular, a first partial channel extends here through the basic body of the piston or between the basic body and the cylinder inner surface, and a second partial channel extends through a valve body of the valve arrangement or between the valve body and the cylinder inner surface. In principle, when the valve arrangement is in the closed state, all of the partial channels may also be at least partially, or completely, closed.

As another example, the automatic switching of the valve arrangement into the closed state takes place only in a single adjustment direction of the gas pressure element, that is to say only in a single direction of movement of the drive connections relative to one another. This adjustment direction corresponds here in particular to the closing direction of the flap, which corresponds to a movement of the drive connections toward one another.

According to yet another embodiment, the valve arrangement may include a valve body which is arranged on the basic body of the piston, such as on the front end piece of the piston, which is referred to as the piston head, and which is adjustable in relation to the basic body into a closed position, which corresponds to the closed state, and into an open position, which corresponds to the open state. The valve body may be pretensioned, in particular spring-pretensioned in the opening direction of the valve arrangement. As an example, the valve body is bistably spring-pretensioned, that is to say, the valve body is pretensioned in the closing direction in its closed position and in the opening direction in its open position. This has the advantage that the valve arrangement, after the compensating flow has exceeded the switching flow, remains activated, at any rate until the valve arrangement is deactivated again, i.e. is switched over into the normal mode. This can take place, for example, by manual actuation of the flap counter to the adjustment direction of the gas pressure element, which adjustment direction has caused the closed state, i.e. in particular in the opening direction of the flap. Instead of a separate spring which bistably spring-pretensions the valve body, the valve body itself may be configured as an elastic membrane which is deformable into two stable positions, and the membrane in the one position defines the open state and in the other position defines the closed state of the switchable valve arrangement.

As an example, the flap arrangement may include liftgate, and a drive arrangement configured to adjust the flap. Reference should be made to the drive arrangement according to the proposal for all of the explanations. The flap may be pivotable about a flap axis which is oriented substantially horizontally in the mounted state.

As another example, an emergency situation leading to the compensating flow exceeding a predefined switching flow is defined by the driving force and/or holding force of the drive failing and thereby forcing the flap in the closing direction or in the opening direction due to spring force and/or due to gravity, and by the emergency-necessitated switching of the valve arrangement into the closed state opposing a further adjustment of the flap, for example by blocking a further adjustment of the flap.

The gas pressure element may pretension the flap, such as in the opening direction thereof. As an example, it is provided that the flap arrangement may include only one drive, on a first side of the flap, and has the gas pressure element, such as one gas pressure element, on the opposite second side. To this extent, this is may be used in an active/passive system. The drive is may be a linear drive, such as spindle drive.

In one or more embodiments, the switching flow which brings about the switching of the valve arrangement into the closed state corresponds to a speed of the outer edge of the flap within a range of between 0.5 m/s and 3.0 m/s, or between 0.8 m/s and 1.2 m/s, such as of 1.0 m/s.

BRIEF DESCRIPTION OF THE DRAWINGS

The present disclosure will be explained in more detail below with reference to a drawing which merely illustrates exemplary embodiments. In the drawing

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known drive arrangement is provided in DE 10 2008 057 014 A1 which provides for motor-operated adjustment of a liftgate of a motor vehicle. On one side of the liftgate, the drive arrangement has a motor-operated drive in the form of a spindle drive which has an electric drive unit and a spindle/spindle-nut gearing which is connected in terms of drive downstream of the electric drive unit and with which linear driving movements are generated between a body-side drive connection and a flap-side drive connection in order to open and close the flap. In an open position of the flap, the spindle drive is in an extended position, whereas the spindle drive is in a retracted position in a closed position of the flap.

Since the weight of the liftgate may be of considerable magnitude, a gas pressure element in the form of a gas spring, which is intended to compensate for the weight of the liftgate, is arranged separately from the spindle drive on the other side of the flap. The effect which is generally intended to be achieved with this is that the liftgate is in the vicinity of the state of equilibrium or is forced in the opening direction. Where such a flap arrangement has a motor-operated drive on the one side and a gas pressure element, here a gas spring, on the other side of the flap, this is also called an active/passive system.

The drive arrangement 1 according to the proposal serves for the motor-operated adjustment of a flap 2 of a motor vehicle. The flap 2 is adjustable by the drive arrangement 1 in an opening direction and/or in a closing direction of the flap 2.

The flap 2 may be a liftgate of the motor vehicle. The drive arrangement 1 according to the proposal may be used particularly advantageously specifically in the "liftgate" application since liftgates are comparatively heavy.

In principle, however, the drive arrangement 1 according to the proposal may also be used in other types of flaps 2 of a motor vehicle. These include trunk lids, front hoods or the like, but also doors. All of the explanations apply correspondingly to other flaps.

Figure 1:
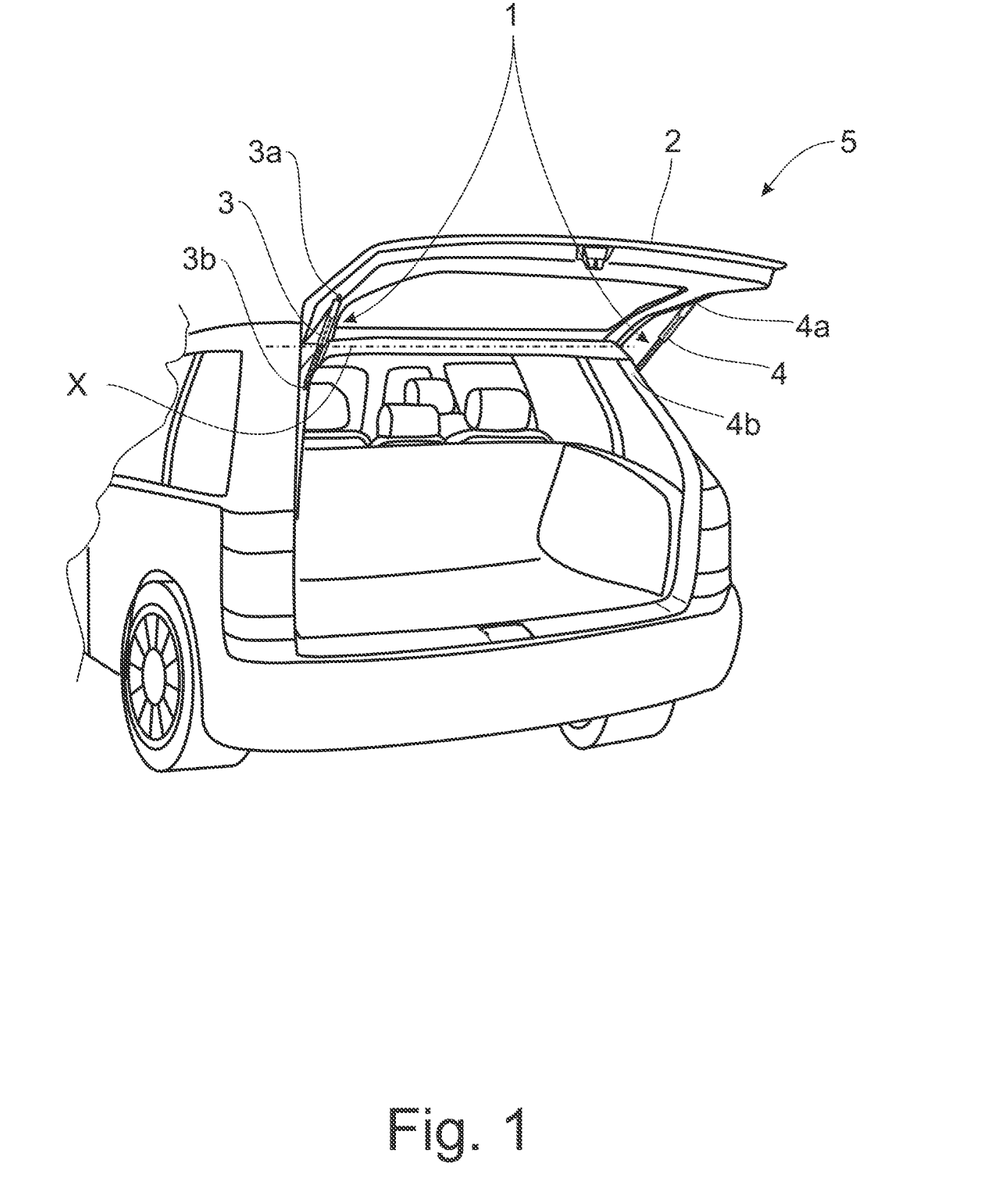
FIG. 1 shows the rear region of a motor vehicle with a flap arrangement according to the proposal which is provided with a drive arrangement according to the proposal.

As FIG. 1 shows, the drive arrangement 1 according to one or more embodiments, may include one motor-operated drive 3 and one gas pressure element 4. The motor-operated drive 3, which will also be explained in more detail below, may be a linear drive, such as spindle drive. The gas pressure element 4 may be a gas spring, such as a gas pressure spring. The gas spring may pretension the flap 2 in the opening direction thereof.

The gas spring is also be a gas tension spring. It is also conceivable for the gas pressure element 4 to be a gas damper, i.e. not to have any resilient action. In this case, but in principle also in the case of a gas spring, the gas pressure element 4 may have an additional spring arrangement which generates a spring force parallel or coaxially to the action direction of the gas pressure element.

In the exemplary embodiments described here, a gas spring is now provided by way of example as the gas pressure element 4. However, the explanations in this regard apply equally to the other gas pressure elements 4 mentioned.

In principle, the drive arrangement 1 according to the proposal may also have more than one motor-operated drive and/or more than one gas pressure element 4. In the case of the flap arrangement 5 which is illustrated in FIG. 1 and which, in addition to the flap 2 of the motor vehicle, also has the drive arrangement 1, the motor-operated drive 3 is arranged on a first side of the flap 2 and the gas pressure element 4 or here the gas spring is arranged on an opposite second side of the flap 2.

The motor-operated drive 3, which here forms the active side of an active/passive system, is designed for opening and closing the flap 2. For this purpose, the drive 3 has a drive unit, not illustrated here, with an electric drive motor and optionally one or more further drive components, such as an intermediate gearing, an overload clutch and/or a brake. As an example, a linear gearing, likewise not illustrated, such as spindle/spindle-nut gearing, is connected in terms of drive downstream of the drive unit and has, as gearing components, such as a spindle and a spindle nut in meshing engagement therewith. As an example, the spindle is coupled in terms of drive to the drive unit and is set into rotation during the operation, as a result of which the spindle nut executes a linear movement along the spindle.

The motor-operated drive 3 having the drive unit and the linear gearing, such as spindle/spindle-nut gearing, has a first, such as spindle-side, drive connection 3a and a second, spindle-nut-side, drive connection 3b, via which connections the drive 3 is coupled to the motor vehicle. The drive 3 may be coupled via the spindle-side drive connection 3a to the flap 2 and via the spindle-nut-side drive connection 3b to the body of the motor vehicle. The linear driving movements of the linear gearing either drive the drive connections 3a, 3b apart, which corresponds to an adjustment movement of the flap 2 in its opening direction, or drive the drive connections 3a, 3b together, which corresponds to an adjustment movement of the flap 2 in its closing direction.

The gas spring may form the gas pressure element 4 and which forms the passive side of the active/passive system does not have a dedicated drive, but rather provides a spring function here. The gas spring is thus intended to absorb some of the weight of the flap 2 and to thereby hold the flap 2, when the latter is open, in the vicinity of the state of equilibrium or to force the flap in the opening direction.

The gas spring has, in a customary manner per se, an outwardly sealed cylinder 6 and a piston 8 which runs in the interior 7, which is radially enclosed by the cylinder 6, along the cylinder axis A and divides the cylinder interior 7 into two partial spaces 7a, 7b. The piston 8 has a piston rod 8a which runs along the cylinder axis A and is movable relative to the cylinder 6. The piston rod 8a in a sealing manner penetrates an axial opening of the cylinder 6, as a result of which a section of the piston rod 8a is arranged in the cylinder interior 7 and a further section is arranged outside the cylinder 6. The piston 8 furthermore has a basic body 8b on the section of the piston rod 8a that is arranged in the cylinder interior 7, such as at the front end of the piston, the basic body such as forming the piston head.

The basic body 8b may have a cross section, with respect to a section in the radial direction, which very substantially corresponds to that of the cylinder interior 7. "Very substantially" means that the basic body 8b of the piston 8 completely closes the cross section of the cylinder interior 7 except for a channel 9a which is may be annular or consists of a plurality of individual channels running next to one another. The channel 9a is one of at least two partial channels 9a, 9b which are fluidically connected to one another and are part of an overflow channel arrangement 9 by which a compensating flow arises between the two partial spaces 7a, 7b upon a movement of the piston. As an example, the partial channel 9a is bounded radially with respect to the throughflow direction with which the compensating flow passes through the partial channel, by the radial inner side of the cylinder 6 on one side and by the radial outer side of the basic body 8b on the other side. Such a configuration of the overflow channel arrangement 9 is provided in the exemplary embodiment of FIG. 2.

Figure 3:
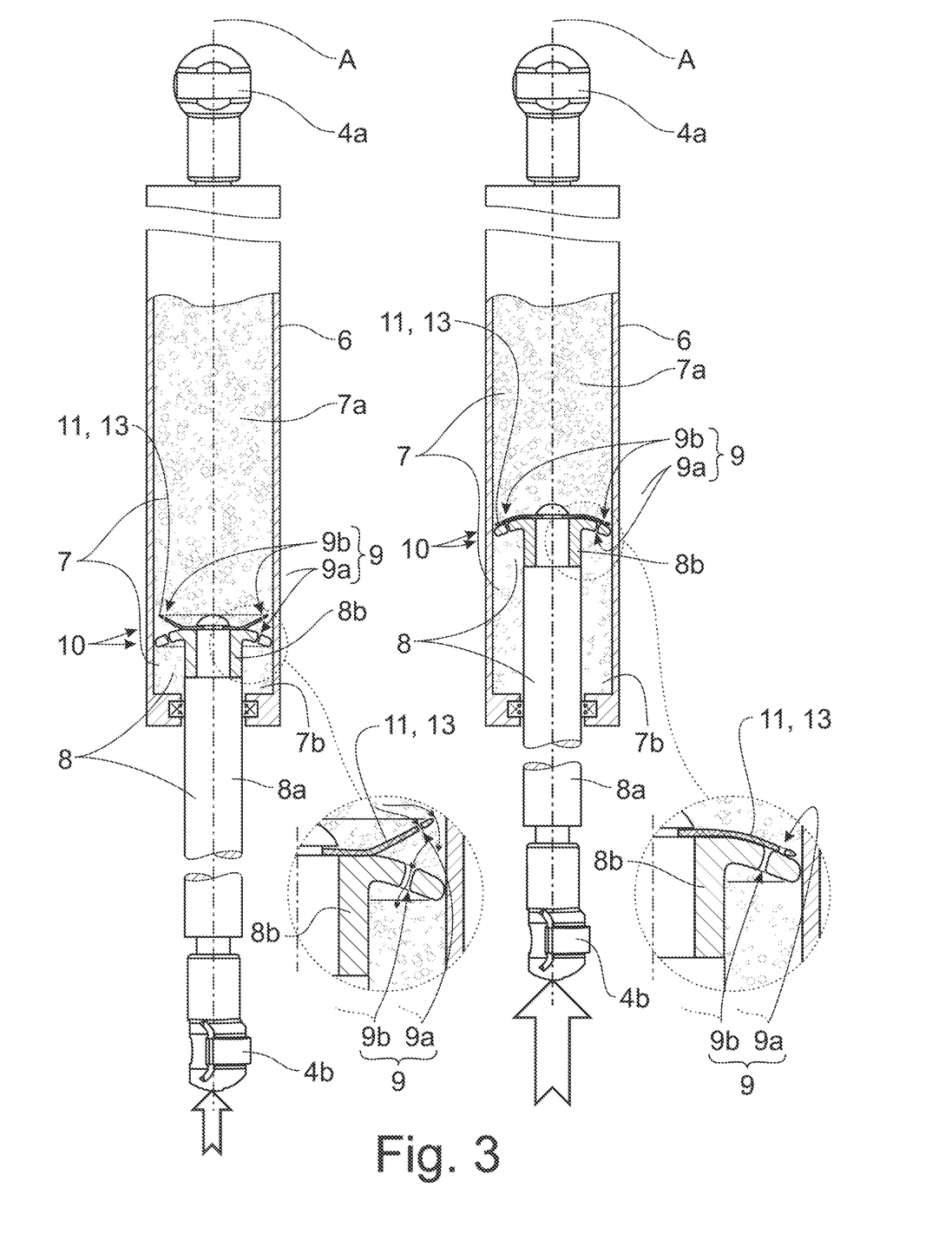
FIG. 3 shows a sectional view of a gas pressure element in a second exemplary embodiment of the drive arrangement according to FIG. 1 in the normal mode and in an emergency mode.

Additionally or alternatively, the partial channel 9a of the overflow channel arrangement 9 may also run through the basic body 8b along the cylinder axis A as one channel or a plurality of individual channels running next to one another, as is provided in the exemplary embodiment of FIG. 3. In the latter case, the channel or each individual channel is laterally, i.e. completely, surrounded by the material of the basic body 8b and is formed, for example, by a bore.

In both cases, the cylinder 6 is at any rate filled with a fluid which is present in both partial spaces 7a, 7b and may flow through the partial channels 9a, 9b of the overflow channel arrangement 9 between the partial spaces 7a, 7b within the scope of the compensating flow. The fluid may be a compressible gas and may have, in small quantities, a liquid, such as oil, in order, for example, to bring about final position damping.

Figure 2:
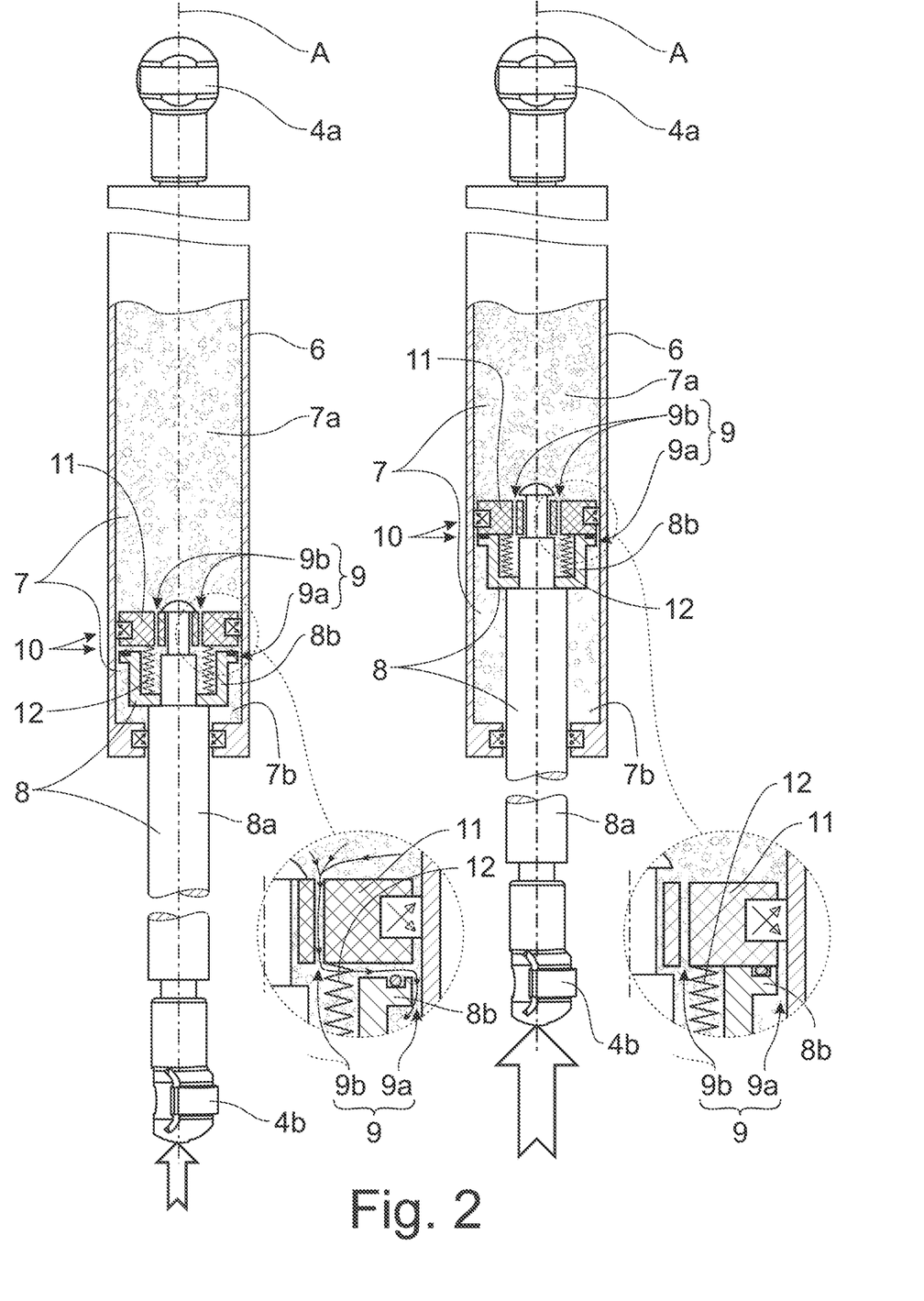
FIG. 2 shows a sectional view of a gas pressure element in a first exemplary embodiment of the drive arrangement according to FIG. 1 in the normal mode and in an emergency mode.

The gas spring furthermore has a first drive connection 4a, which is connected to the cylinder 6, and a second drive connection 4b, which is connected to the piston 8. The cylinder 6 here is filled with the pressurized fluid in such a manner that the two drive connections 4a, 4b are driven apart. In the unloaded state, i.e. when no forces act on the gas spring from the outside, the two drive connections 4a, 4b of the gas spring are therefore in the position driven apart to the maximum, which is shown in FIGS. 2 and 3 for the respective exemplary embodiment in each case in the left illustration. This position of the drive connections 4a, 4b relative to one another may also correspond to the open position of the flap 2 that is illustrated in FIG. 1. The cylinder-side drive connection 4a is coupled here to the flap 2 and the piston-side drive connection 4b to the body of the motor vehicle. It should be emphasized once again that, as previously explained, the cylinder 6 may also be pressure-free, namely in the case of a gas damper instead of a gas spring.

In the normal mode, in the event of an external force driving the drive connections 4a, 4b together, for example during a motor-operated or manual closing of the flap 2, the piston 8 is now deflected relative to the cylinder 6 from the position shown in each case in the left illustration in FIGS. 2 and 3, specifically in the direction of the position illustrated in the right illustration in FIGS. 2 and 3. The section of the piston 8 that is arranged in the cylinder interior 7 therefore moves along the cylinder axis A through the cylinder interior 7, as a result of which the two partial spaces 7a, 7b of the cylinder interior 7 change their volume. As determined from FIGS. 2 and 3, in the exemplary embodiments selected here, when the drive connections 4a, 4b are driven together, the volume of the partial space 7a is reduced, whereas the volume of the partial space 7b is increased. As the detailed view of the left illustration in FIGS. 2 and 3 shows, the fluid flows here as a compensating flow from the upper partial space 7a into the lower partial space 7b through the partial channels 9a, 9b of the overflow channel arrangement 9. Since the fluid is inserted under pressure into the cylinder 6, the fluid presses onto the cross-sectional surface of the piston 8, here of the basic body 8b, and thereby presses the piston 8 relative to the cylinder 6 continuously into the position which is illustrated on the left in FIGS. 2 and 3. The reason for this is that the cross-sectional surface of the piston 8 or of the basic body on the side facing away from the piston, i.e. here toward the partial space 7a, is larger than on the opposite side since, on the opposite side, the cross-sectional surface acted upon by the fluid pressure is formed merely by a ring running around the piston rod 8a. The ring surface which is effective on the side of the partial space 7b is smaller than the surface which is effective on the side of the partial space 7a and which corresponds to the overall cross section of the cylinder interior 7. Correspondingly, a greater compressive force acts on the piston 8 or basic body 8b from the partial space 7a than from the other side, as a result of which the piston 8 is continuously pushed out of the cylinder 6.

The piston 8 is assigned a switchable valve arrangement 10 which may be brought into a closed state, in which it at least partially, such as completely, closes the overflow channel arrangement 9, and into an open state, in which it opens the overflow channel arrangement 9, and that the overflow channel arrangement 9 automatically switches into the closed state in the event of an, an emergency-necessitated, compensating flow which exceeds a predetermined switching flow. This applies, as stated, both for the use of a gas spring and of a gas damper, optionally also in combination with an additional spring arrangement acting in the direction of action of gas spring or gas damper.

With the switchable valve arrangement 10, a possibility is created of being able to switch over the gas spring automatically from a normal mode into an emergency mode. An emergency situation occurs, for example, if the speed at which the flap 2 is moved between its open position and its closed position, such as closed, exceeds a certain limit value, i.e. the closing movement is increased. The increased speed of the flap 2 in turn increases the flow of speed of the compensating flow which flows through the overflow channel arrangement 9, and, correspondingly, the dynamic pressure in the partial space 7a facing away from the piston increases and the dynamic pressure in the partial space 7b on the piston-rod side decreases until the valve arrangement 10 switches from the open state into the closed state, such as when a predetermined pressure difference (switching pressure difference) is reached. In the closed state, the overflow channel arrangement 9 is then either partially closed, such that a linear movement of the piston 8 relative to the cylinder 6 is at any rate braked, or completely closed, such that the linear movement of the piston 8 relative to the cylinder 6 is blocked, at any rate after a certain compression of the fluid in the partial space 7a is reached.

The predetermined switching flow, the exceeding of which switches the valve arrangement 10 into the closed state, i.e. activates the valve arrangement 10, which may correspond to a piston speed within a range of between 20 mm/s and 200 mm/s, or between 40 mm/s and 70 mm/s, or a piston speed of 50 mm/s. With respect to the flap 2 itself, it may be provided that the switching flow corresponds to a speed of the outer edge of the flap 2 within a range of between 0.5 m/s and 3.0 m/s, or between 0.8 m/s and 1.2 m/s, or of 1.0 m/s. At a lower piston speed or edge speed, the gas spring functions in the normal mode.

As an example, the overflow channel arrangement 9, as stated, has at least two partial channels 9 a, 9 b, of which one partial channel 9 is formed between the basic body 8 b and the cylinder 6 (FIG. 2) or within the basic body 8 b (FIG. 3). A further partial channel 9 b may be formed in a separate valve body 11. The valve arrangement 10 may include a valve body 11 which is arranged on the basic body 8 b of the piston 8 and which is adjustable in relation to the basic body 8 b into a closed position, which corresponds to the closed state of the valve arrangement 10, and into an open position, which corresponds to the open state of the valve arrangement 10. When the illustration on the left in each case is compared with the illustration on the right in each case in FIG. 2 and FIG. 3, it is determined that, in the activated state of the valve arrangement 10, the partial channel 9 a provided by the basic body 8 b is closed by contact of the valve body 11 against the basic body 8 b.

As another example, the partial channel 9b provided by the valve body 11 runs through the valve body 11 along the cylinder axis A as one channel or a plurality of individual channels running next to one another. The channel or each individual channel is therefore laterally completely surrounded by the material of the valve body 11 as is formed, for example, by a bore. In principle, it would, however, also be conceivable for the partial channel 9b to be bounded radially with respect to the throughflow direction, with which the compensating flow flows through the partial channel, by the radial inner side of the cylinder 6 on one side and by the radial outer side of the valve body 11 on the other side.

The automatic switching of the valve arrangement 10 into the closed state takes place only in a single adjustment direction of the gas spring, which adjustment direction may correspond to the closing direction of the flap 2. Whenever the compensating flow exceeds the predetermined switching flow, the valve arrangement 10 is closed only in this direction, such as the valve body 11 is pressed against the basic body 8b of the piston 8. In principle, however, other configurations of the valve arrangement 10 are conceivable for other applications. As an example, the valve body 11 is arranged in the compensating flow in such a manner that, in the event of the, an emergency-necessitated, exceeding of the switching flow, such as due to the dynamic pressure attributed to the compensating flow, the compensating flow transfers the valve body 11 from the open position into the closed position.

For this purpose, in the case of the exemplary embodiment according to FIG. 2, the valve body 11 is guided on the basic body 8b along the cylinder axis A. The valve body 11 is thus displaceable relative to the basic body 8b. The valve body 11 may be a substantially plate-like, non-deformable element which is movable axially along the piston 8 coaxially to the cylinder axis A. As an example, the valve body 11 is pretensioned in the opening direction of the valve arrangement 10, here is spring-pretensioned via a spring arrangement 12. The valve body 11 is thereby pressed into the position corresponding to the open state of the valve arrangement 10.

After the automatic switching of the valve arrangement 10 into the closed state, the valve body 11 may remain in the closed position as long as the difference in the static pressure between the two partial spaces 7a, 7b of the cylinder 6 exceeds a switching pressure difference. The difference in the static pressure may drop below a limit value for the switching pressure difference due to tolerance-induced or defined leakages after some time, as a result of which the valve arrangement 10 passes again into the open state. However, may then take place at such a slow speed that the flap 2 only gradually drops further in the closing direction.

Additionally, the valve body 11 is bistably spring-pretensioned in such a manner that the latter, when it is in the closed position, is pretensioned, such as spring-pretensioned, in the closing direction of the valve arrangement 10, and when the valve body is in the open position, is pretensioned, such as spring-pretensioned, in the opening direction of the valve arrangement 10. This may be achieved by the fact that the spring arrangement 12 has a tilting spring acting on the valve body.

A pretensioning of the valve body 11 in the closed position in the closing direction of the valve arrangement 10 has the advantage that the activated valve arrangement 10, in particular necessitated by an emergency, cannot readily pass again into the open state. This may be possible by a manual actuation of the flap 2 counter to the adjustment direction in which the valve arrangement 10 has been previously activated, such as by manual actuation of the flap 2 in the opening direction thereof.

The latter, as is the case in the exemplary embodiment according to FIG. 3, may also be achieved in that the valve body 11 is configured as an elastic membrane 13 which is deformable into two stable positions. In this respect, the valve body 11 itself then forms a tilting spring. If, as shown in the left illustration in FIG. 3, the valve body 11 is in the open position, the valve body then assumes a form by which it is pretensioned in the opening direction of the valve arrangement 10. If, as shown in the right illustration in FIG. 3, the valve body 11 is in the closed position, the valve body, by contrast, assumes a form by which it is pretensioned in the closing direction of the valve arrangement 10. For this purpose, the membrane 13 in the two stable positions that may each have a conical shape which differ from one another, in particular open in opposite directions.

According to a one or more embodiments, a flap arrangement 5 comprising a flap 2, such as a liftgate, and a drive arrangement 1 is provided.

As an example, this involves a flap 2 which is pivotable about a flap axis X which is oriented substantially horizontally in the mounted state. Specifically, in this application, as has been explained previously, the drive arrangement 1 according to the proposal may be used particularly advantageously. This applies to an emergency situation, as has been previously explained, such as the speed of the flap 2 is increased.

In the case of the flap arrangement 5 according to the proposal, an emergency situation is defined, for example, by the driving force and/or holding force of the drive 3 failing and thereby forcing the flap 2 in the closing direction or in the opening direction due to spring force and/or due to gravity, and by the emergency-necessitated switching of the valve arrangement 10 into the closed state opposing a further adjustment of the flap 2 and blocking a further adjustment of the flap 2.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1 drive arrangement
2 flap
3 drive
4 gas pressure element
5 flap arrangement
6 cylinder
7 cylinder interior
8 piston
9 overflow channel arrangement
10 valve arrangement
11 valve body
12 spring arrangement
13 membrane
3a drive connections
4a first drive connection
4b second drive connection
7a partial space
7b partial space
8a piston rod
8b basic body
9a partial channels
9b partial channels While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive arrangement configured to adjust a flap of a motor vehicle, the drive arrangement comprising:
   a motor-operated drive; and
   a gas pressure element including,
   a sealed cylinder defining a cylinder axis and including an interior portion containing a pressurized fluid,
   a piston configured to move along the cylinder axis within the interior portion, wherein the piston divides the interior portion into a first space and a second space, and includes an overflow channel arrangement configured to facilitate a flow of the pressurized fluid between the first space and the second space,
   a first drive connection connected to the sealed cylinder,
   a second drive connection connected to the piston, and
   a switchable valve arrangement configured to change between a closed state, in which the overflow channel arrangement is closed, and an open state in which the overflow channel arrangement is open, in response to an emergency event causing a compensating flow to exceed a predetermined switching flow,
   wherein automatic switching of the valve arrangement into the closed state is provided only in a single adjustment direction of the gas pressure element, and wherein the adjustment direction of the gas pressure element corresponds to the closing direction of the flap.

2. The drive arrangement of claim 1, wherein the gas pressure element includes a spring arrangement provided with a helical spring, arranged coaxially to the sealed cylinder.

3. The drive arrangement as claimed in claim 1, wherein the switching flow corresponds to a piston speed within a range of between 20 mm/s and 200 mm/s.

4. The drive arrangement as claimed in claim 1, wherein the overflow channel arrangement has at least two partial channels, and wherein the valve arrangement in the closed state closes at least one of the partial channels.

5. The drive arrangement as claimed in claim 1, wherein the piston has a body that is at least partially sealed in relation to an inner surface of the cylinder that provides part of the overflow channel arrangement, and wherein the valve arrangement has a valve body which is arranged on the body of the piston and is adjustable in either a closed position which corresponds to the closed state or into an open position which corresponds to the open state.

6. The drive arrangement as claimed in claim 5, wherein the valve body is arranged in the compensating flow in such a manner that, in the event of an emergency-necessitated, exceeding of the switching flow due to dynamic pressure attributed to the compensating flow, the compensating flow transfers the valve body from the open position into the closed position.

7. The drive arrangement as claimed in claim 5, wherein the valve body of the valve arrangement is guided on the body of the piston along the cylinder axis.

8. The drive arrangement as claimed in claim 5, wherein the valve body is pretensioned in the opening direction of the valve arrangement so that once the valve arrangement automatically switches into the closed state, the valve body remains in the closed position as long as a difference in static pressure between the two partial spaces of the cylinder exceeds a switching pressure difference.

9. The drive arrangement as claimed in claim 5, wherein the valve body is bistably spring-pretensioned such that the valve body, when in the closed position, is pretensioned in the closing direction of the valve arrangement and the valve body, when in the open position, is pretensioned in the opening direction of the valve arrangement.

10. The drive arrangement as claimed in claim 5, wherein the valve body is configured as an elastic membrane which is deformable into two stable positions, wherein the membrane has conical shaping's which are different from one another, in particular open in opposite directions, in the two stable positions.

11. A flap arrangement comprising:
    a flap; and
    a drive arrangement operably coupled to the flap, the drive arrangement including:
    a motor-operated drive, and
    a gas pressure element including,
    a sealed cylinder defining a cylinder axis and including an interior portion containing a pressurized fluid,
    a piston configured to move along the cylinder axis within the interior portion, wherein the piston divides the interior portion into a first space and a second space, and includes an overflow channel arrangement configured to facilitate a flow of the pressurized fluid between the first space and the second space,
    a first drive connection connected to the sealed cylinder,
    a second drive connection connected to the piston, and
    a switchable valve arrangement configured to change between a closed state, in which the overflow channel arrangement is closed, and an open state in which the overflow channel arrangement is open, in response to an emergency situation causing a compensating flow to exceed a predetermined switching flow,
    wherein automatic switching of the valve arrangement into the closed state is provided only in a single adjustment direction of the gas pressure element, and wherein the adjustment direction of the gas pressure element corresponds to the closing direction of the flap.

12. The flap arrangement as claimed in claim 11, wherein the emergency situation is defined by the driving force and/or a holding force of the motor-operated drive failing and thereby forcing the flap in the closing direction or in the opening direction due to spring force or due to gravity, and by an emergency-necessitated switching of the valve arrangement into the closed state opposing a further adjustment of the flap.

13. The flap arrangement as claimed in claim 12, wherein the gas pressure element pretensions the flap in the opening direction and wherein the flap arrangement has the motor-operated drive on a first side of the flap, and has the gas pressure element on the opposite second side of the flap.

14. The flap arrangement as claimed in claim 11, wherein the switching flow corresponds to a speed of an outer edge of the flap in a range of between 0.5 m/s and 3.0 m/s.

15. The flap arrangement as claimed in claim 11, wherein the piston has a body that is at least partially sealed in relation to an inner surface of the cylinder that provides part of the overflow channel arrangement, and wherein the valve arrangement has a valve body which is arranged on the body of the piston and is adjustable in either a closed position which corresponds to the closed state or into an open position which corresponds to the open state.

16. A drive arrangement configured to adjust a flap of a motor vehicle, the drive arrangement comprising:

a motor-operated drive; and a gas pressure element including a cylinder and a piston slidably disposed within cylinder and dividing an interior portion into a first space and a second space, the piston defining an overflow channel connecting between the first and second spaces, wherein the gas pressure element further includes a first drive connection connected to the cylinder, a second drive connection connected to the piston, and a switchable valve arrangement configured to close the overflow channel in response to a compensating flow exceeding a predetermined switching flow, wherein the gas pressure element further includes a helical spring biasing the valve arrangement away from the piston.

17. The drive arrangement as claimed in claim 16, wherein the switching flow corresponds to a piston speed within a range of between 20 mm/s and 200 mm/s.

18. The drive arrangement as claimed in claim 16, wherein the valve arrangement includes a valve body slidably mounted to the piston such that the valve arrangement is in an open position when the valve body is spaced from the piston and is in a closed position when the valve body is in contact with the piston.

* * * * *